(12) United States Patent  (10) Patent No.: US 6,742,802 B2
Maxisch  (45) Date of Patent: Jun. 1, 2004

(54) COLLAPSIBLE STROLLER CHASSIS

(75) Inventor: Peter Maxisch, Paderborn (DE)

(73) Assignee: Britax Teutonia Kinderwagenfabrik GmbH, Hiddenhausen (DE)

( * ) Notice: Subject to any disclaimer, the term of this patent is extended or adjusted under 35 U.S.C. 154(b) by 0 days.

(21) Appl. No.: 10/191,303

(22) Filed: Jul. 8, 2002

(65) Prior Publication Data
US 2003/0020260 A1 Jan. 30, 2003

(30) Foreign Application Priority Data

Jul. 26, 2001 (GE) .......................... 201 12 122

(51) Int. Cl.$^7$ .................................. B62B 1/00
(52) U.S. Cl. ......................... 280/649; 280/47.38
(58) Field of Search ................... 280/649, 642, 280/644, 647, 650, 657, 658, 47.38; D12/129

(56) References Cited

U.S. PATENT DOCUMENTS 2,278,582 A * 4/1942 Feldman ..................... 280/649
2,296,193 A * 9/1942 Siebert ....................... 280/649
2,823,925 A * 2/1958 Withers .................... 280/47.38
2,972,488 A * 2/1961 Alsop .................... 280/47.371
3,145,999 A * 8/1964 Burnham ..................... 280/649
3,627,342 A * 12/1971 Morellet ..................... 280/649
6,354,619 B1 * 3/2002 Kim ............................ 280/651

FOREIGN PATENT DOCUMENTS

AU      694405       *  7/1998
DE     2644634       *  4/1978
DE    19914528       * 10/2000
FR     2659926       *  9/1991

* cited by examiner

Primary Examiner—Bryan Fischmann
(74) Attorney, Agent, or Firm—Davis & Bujold, P.L.L.C.

(57) ABSTRACT

A collapsible stroller chassis has two laterally arranged scissor frameworks, which form a top part, and a substructure which bears the wheel axles. The substructure and ends of the scissor arms of the scissor frameworks are connected to one another by articulations such that, at least in the erected state of the top part, an effectively rigid structural unit is formed by the substructure and by the top part.

15 Claims, 2 Drawing Sheets

COLLAPSIBLE STROLLER CHASSIS

FIELD

This invention relates to a collapsible stroller chassis which has two laterally arranged scissor frameworks, which form a top part, and a substructure, which bears the wheel axles.

RELATED ART

The stroller chassis of the type in question is known in a large number of configurations. Also arranged on the stroller chassis is a push bar which, in the normal use state, is locked. If it is intended, however, for the stroller to be transported in the empty state, the stroller chassis is collapsed. For this purpose, first of all the push bar has to be unlocked and pivoted beyond the stroller chassis. If spring elements are used for this purpose, these are subject to wear. The substructure is arranged resiliently in relation to the top part. During the collapsing operation, the spacing between the two axles increases, this resulting in the collapsed assembly being relatively long. Moreover, the lateral stability of the stroller chassis is not satisfactory.

In the case of the prior-art constructions, the top part can move in relation to the substructure, albeit within relatively narrow limits. This has an adverse effect on comfort when the stroller is on the move.

SUMMARY OF THE INVENTION

An object of the invention is to configure a stroller chassis of the type described in detail in the introduction such that, while maintaining the smallest possible dimensions in the collapsed state, the lateral stability is increased in order to increase the comfort when the stroller is on the move.

This object is achieved in that the substructure and the facing ends of the scissor arms of the scissor framework are connected to one another by articulations such that, at least in the erected state of the top part, a rigid structural unit, is formed by the substructure and by the top part.

By virtue of the rigid structural unit, the lateral stability of the stroller chassis, and thus the comfort when the stroller is on the move, is increased to a considerable extent. Since, as with prior art strollers, the substructure and the top part are connected by movable elements, there will be the usual play or slackness between the various elements. The term "rigid structural unit" is used herein to include structural units in which some movement between the structural elements is permitted by such play and/or interengage slackness. The articulations are designed such that, for collapsing and for erecting the top part, there is no need to overcome any significant frictional forces. However, the articulations are designed so as to compensate for the increasing spacings between the bottom ends of the scissor arms during the operation of collapsing the stroller chassis. Since the spacing between the wheel axles then no longer changes, the amount of space required in the collapsed state is reduced since the collapsed assembly is shorter than the configurations which have been known up until now. Moreover, the operation of loading an automobile trunk is made easier. Moreover, the substructure has a frame, and the wheel axles are secured by means of resilient bearing blocks on those members of the frame which run parallel to, and are spaced apart from, the wheel axles. As a result of the resilient bearing blocks, the wheel axles are arranged resiliently in relation to the substructure. In order to compensate for the increase in the spacing between the bottom ends of the scissor arms during the operation of collapsing the stroller chassis, the articulations are mounted pivotably on the substructure, and each of the scissor arms is pivotally mounted on the opposite end region of a respective articulation. The articulations expediently comprise two side parts which are connected to one another by at least one central crosspiece located on the side directed away from the scissor arms. The necessary movements of the articulations and of the scissor arms are made possible as a result. Each articulation is expediently a single-piece molding, since this reduces the production costs.

For reasons of safety, a certain spacing between the wheel axles is necessary in order to prevent, for example, tilting. A compact, material-saving configuration is achieved if the wheel axles are arranged on the mutually remote sides of the two frame members of the substructure running parallel thereto. The dimensions of the frame of the substructure can then be minimized, the necessary spacing between the wheel axles being provided. When the stroller is placed on a horizontal surface, the frame is likewise located horizontally. At least the members which run parallel to, and are spaced apart from, the wheel axles are located level with the wheel axles or are offset a little way upwards. The bearing blocks are expediently configured in two parts. The two parts for each bearing block may then be connected firmly to one another by screws. The bores for securing the wheel axles are designed such that the wheel axles are clamped firmly. As, in the prior art, the stroller chassis is secured in its erected state by means of locking means on the push bar (handle). The articulations are expediently mounted on those members of the frame which are located transversely to the wheel axles. This distributes the load over the various members of the frame. The bearing blocks are designed for resilient connection to the substructure or the frame.

DETAILED DESCRIPTION OF THE PREFERRED EMBODIMENT

Figure 1:
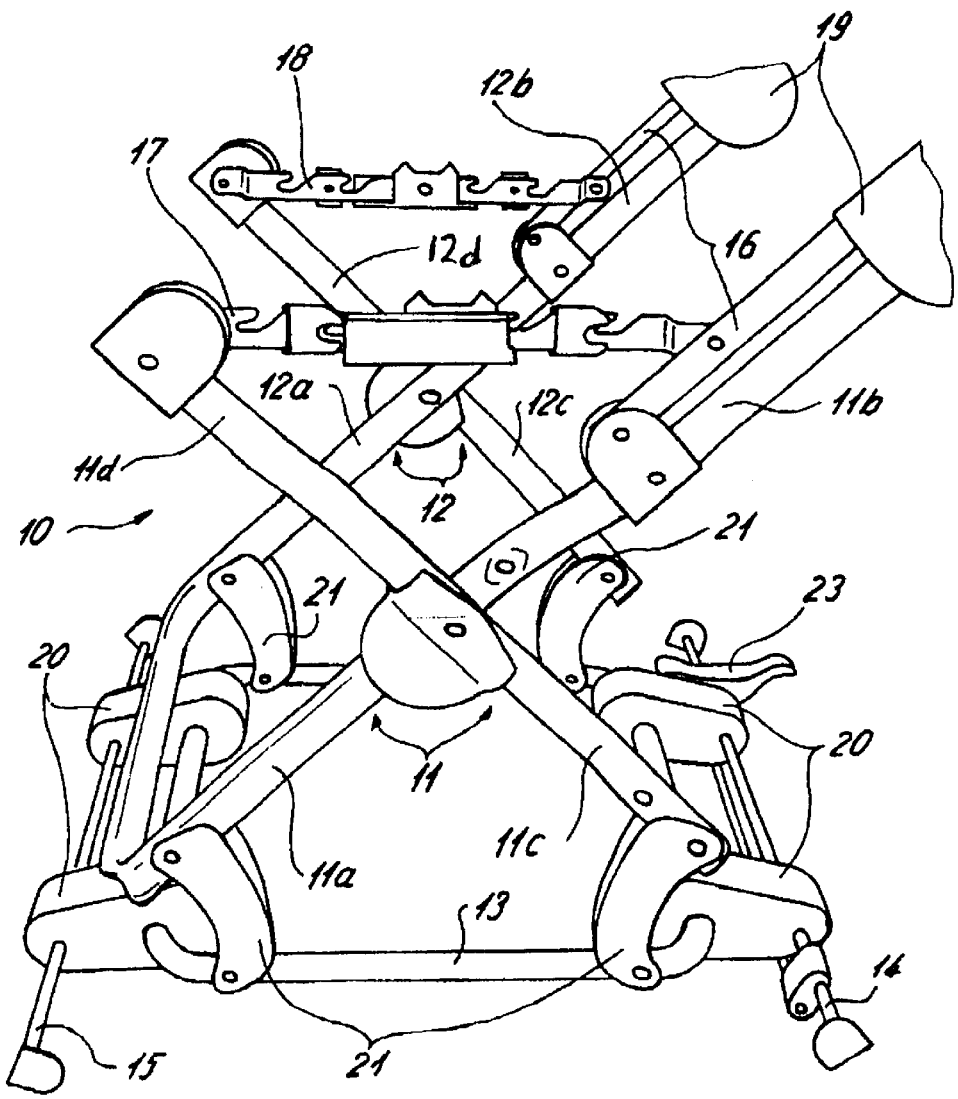
FIG. 1 is a view of part of the stroller chassis in the erected state.

The stroller chassis 10 illustrated in the drawings essentially comprises two lateral scissor frameworks 11, 12, a substructure 13 in the form of a frame, two wheel axles 14, 15, which run parallel to, and are spaced apart, from one another, a pivotable push bar 16 and two locking bars 17, 18, for securing a seat or recliner insert. Also belonging to the stroller chassis 10 are four wheels, which are mounted in a freely rotatable manner at the end regions of the wheel axles 14, 15 and, for reasons of clarity, have been removed. The scissor frameworks 11, 12 comprise the crossover scissor arms 11a, 11b, 11c, 11d, 12a, 12b, 12c, 12d. The points of rotation of the scissor arms 11a, 11b, 11c, 11d, 12a, 12b, 12c, 12d are located approximately in the centers. The scissor arms 11b and 12b are longer than the other arms and have the push bar 16 mounted thereon by means of locking slides 19.

In the embodiment illustrated, the substructure 13 is configured as a closed rectangular frame, the corners being arcuate. Four bearing blocks 20 are clamped firmly, adjacent to the corner regions, on those two members of the substructure 13 which run parallel to the wheel axles 14, 15. The mutually opposite ends are provided with through-bores which are designed such that the wheel axles 14 and 15 are retained in a non-movable manner. In the exemplary embodiment illustrated, the substructure 13 is slightly higher than the wheel axles 14, 15. However, it is possible for this difference in height to be changed.

Figure 2:
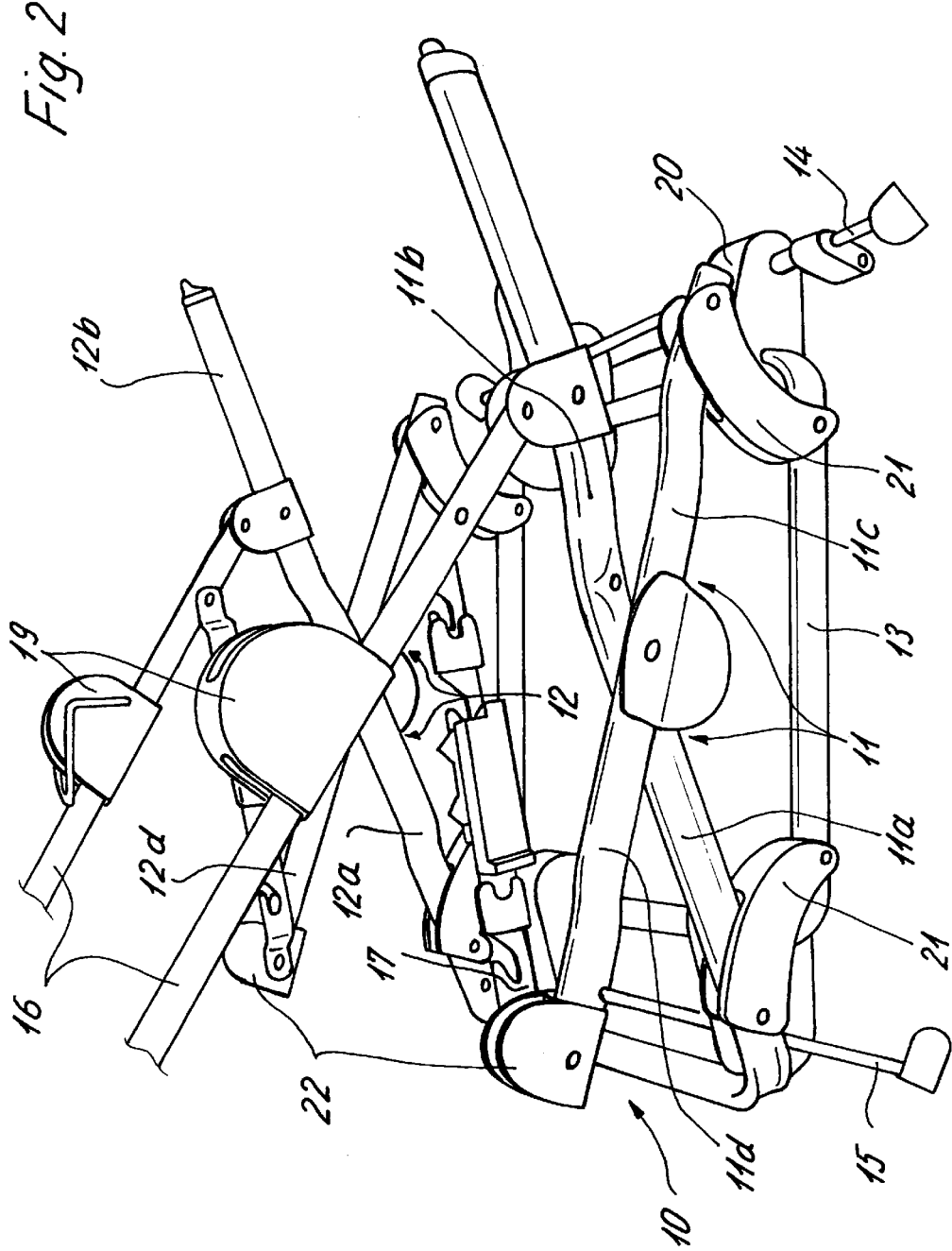
FIG. 2 shows the stroller chassis according to FIG. 1 in the partially collapsed state.

The bottom ends of the scissor arms 11a, 11c, 12a, 12c, are coupled to the substructure 13 via segment-like articulations 21. The articulations 21 are pivotally coupled to those members of the frame 13 which are located transversely to the wheel axles 14, 15. The articulations 21 are designed so that the scissor framework 11 can be collapsed once locking slides 19 on the push bar have been unlocked. The scissor arms 11a, 11b, 11c, 11d, 12a, 12b, 12c, 12d are then located at an extremely small acute angle in relation to one another as shown in FIG. 2. The push bar 16 is secured in pockets 22 which are fastened at the top end regions of the scissor arms 11d, 12d. The bearing blocks 20 are designed to provide the stroller undercarriage with a resilient suspension in a known manner which is not illustrated in detail. The scissor frameworks 11 and the substructure 13 are produced from steel tubes. The stroller chassis 10 is also provided with a parking brake, which can be actuated by a pedal 23.

The invention is not restricted to the exemplary embodiment illustrated. It is essential for the scissor frameworks 11, 12 to be connected to the substructure 13 via the articulations 21 in order for it to be possible to compensate for the increase in spacing between the bottom ends of the scissor arms during the collapsing operation.

What is claimed is:

1. A collapsible stroller chassis movable between an erected state and a collapsed state and having:
   a substructure comprising a rectangular frame having two longitudinal members and two transverse members,
   two wheel axles, each secured to a respective transverse member by resilient bearing blocks,
   a top part comprising two laterally arranged pairs of scissor arms, and
   each of four articulations mounting the substructure to a facing end of a respective scissor arm so that, in the erected state, the substructure and the top part form a rigid structural unit.

2. The collapsible stroller chassis as claimed in claim 1, wherein one end of each of the articulations is mounted pivotally on the substructure, and the scissor arms are mounted pivotally to the opposite end of each of the articulations.

3. The collapsible stroller chassis as claimed in claim 2, wherein the wheel axles are arranged on the sides of the transverse members that are mutually remote from each other.

4. The collapsible stroller chassis as claimed in claim 3, wherein the frame is offset upwardly relative to the wheel axles.

5. The collapsible stroller chassis as claimed in claim 4, wherein the articulations are mounted on the transverse members of the substructure.

6. The collapsible stroller chassis as claimed in claim 2, wherein the frame is offset upwardly relative to the wheel axles.

7. The collapsible stroller chassis as claimed in claim 6, wherein the articulations are mounted on the transverse members of the substructure.

8. The collapsible stroller chassis as claimed in claim 2, wherein the articulations are mounted on the transverse members of the substructure.

9. The collapsible stroller chassis as claimed in claim 1, wherein the wheel axles are arranged on the sides of the transverse members that are mutually remote from each other.

10. The collapsible stroller chassis as claimed in claim 9, wherein the frame is offset upwardly relative to the wheel axles.

11. The collapsible stroller chassis as claimed in claim 10, wherein the articulations are mounted on the transverse members of the substructure.

12. The collapsible stroller chassis as claimed in claim 1, wherein the frame is offset upwardly relative to the wheel axles.

13. A The collapsible stroller chassis as claimed in claim 12, wherein the articulations are mounted on the transverse members of the substructure.

14. The collapsible stroller chassis as claimed in claim 1, wherein the wheel axles are arranged on the sides of the transverse members that are mutually remote from each other.

15. The collapsible stroller chassis as claimed in claim 14, wherein the articulations are mounted on the transverse members of the substructure.

* * * * *